(12) United States Patent
Okuhara et al.

(10) Patent No.: US 9,118,887 B2
(45) Date of Patent: Aug. 25, 2015

(54) COMMUNICATION APPARATUS, CONTROL METHOD THEREFOR, AND STORAGE MEDIUM

(71) Applicant: CANON KABUSHIKI KAISHA, Tokyo (JP)

(72) Inventors: Ryusuke Okuhara, Yokohama (JP); Hitoshi Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 14/015,128

(22) Filed: Aug. 30, 2013

(65) Prior Publication Data

US 2014/0063290 A1    Mar. 6, 2014

(30) Foreign Application Priority Data

Sep. 3, 2012    (JP) .................. 2012-192925

(51) Int. Cl.
*H04N 5/232* (2006.01)
*H04N 5/76* (2006.01)
*H04N 5/907* (2006.01)
*H04N 5/77* (2006.01)
*H04N 5/765* (2006.01)

(52) U.S. Cl.
CPC ........... *H04N 5/907* (2013.01); *H04N 5/23293* (2013.01); *H04N 5/772* (2013.01); *H04N 5/765* (2013.01)

(58) Field of Classification Search
CPC ... H04N 5/907; H04N 5/23293; H04N 5/772; H04N 5/765
USPC ............... 348/211.1, 211.2, 231.7, 231.9
See application file for complete search history.

(56) References Cited

U.S. PATENT DOCUMENTS

| 2006/0000914 A1* | 1/2006 | Chen ........................... 235/492 |
| 2006/0246840 A1* | 11/2006 | Borowski et al. ............ 455/41.2 |
| 2012/0242845 A1* | 9/2012 | Tan ............................ 348/207.1 |

FOREIGN PATENT DOCUMENTS

JP    2011-128910 A    6/2011

* cited by examiner

*Primary Examiner* — Twyler Haskins
*Assistant Examiner* — Quang Le
(74) *Attorney, Agent, or Firm* — Canon USA, Inc., IP Division

(57) ABSTRACT

In a communication apparatus to which a recording medium is attachable, a display unit displays, in a case where a recording medium attached to the communication apparatus includes a wireless communication function not included in a wireless communication unit in the communication apparatus, an item related to a wireless communication function included in the wireless communication unit in the communication apparatus and an item related to a wireless communication function not included in the wireless communication unit in the communication apparatus from among wireless communication functions included in the recording medium.

15 Claims, 11 Drawing Sheets

FIG.4A
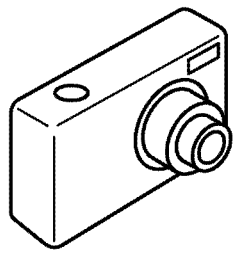 BUILT-IN WIRELESS FUNCTION 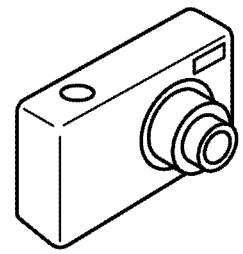
FIG.4B
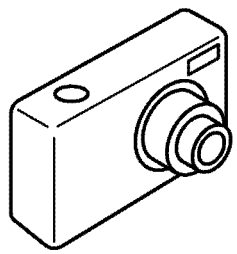 BUILT-IN WIRELESS FUNCTION 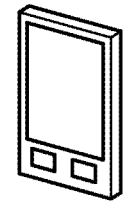
FIG.4C
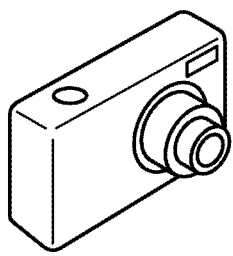 BUILT-IN WIRELESS FUNCTION 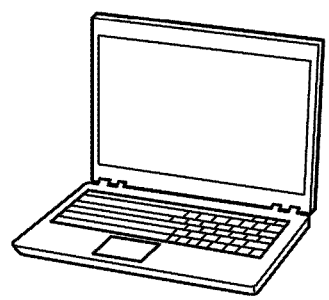
FIG.4D
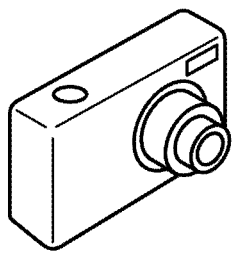 BUILT-IN WIRELESS FUNCTION 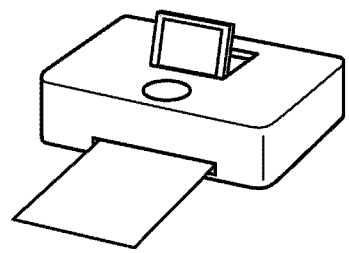

FIG.7
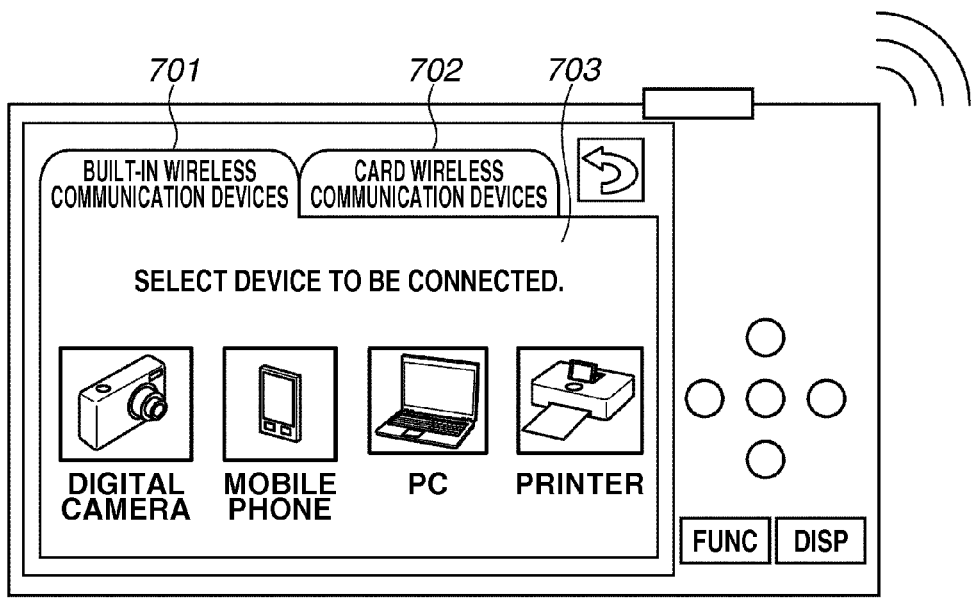
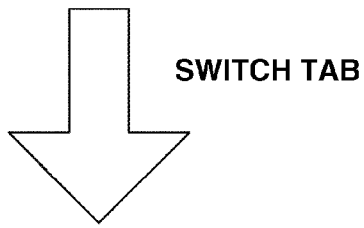
SWITCH TAB
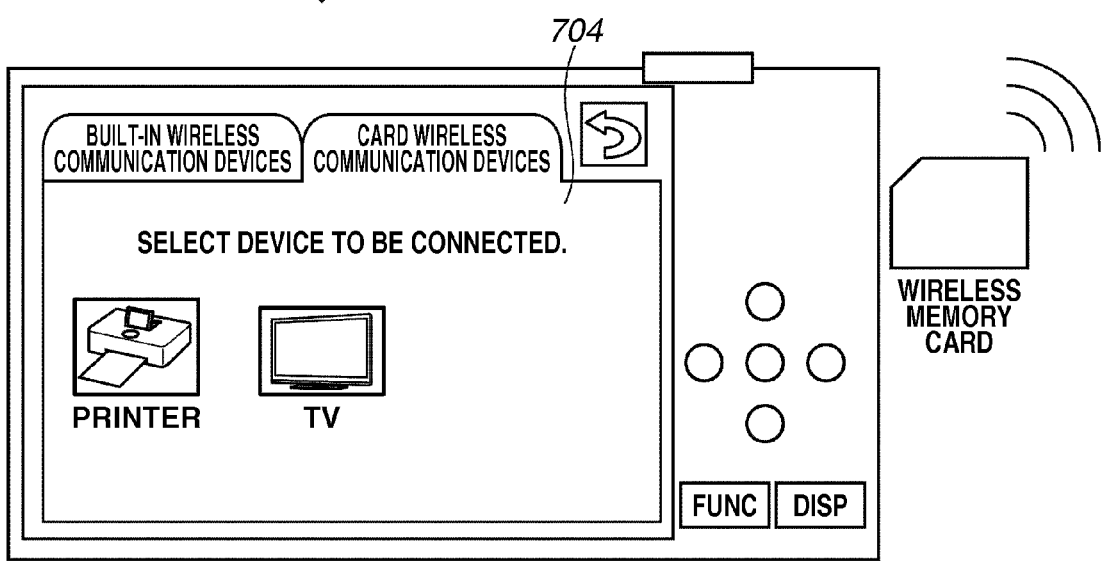

FIG.8
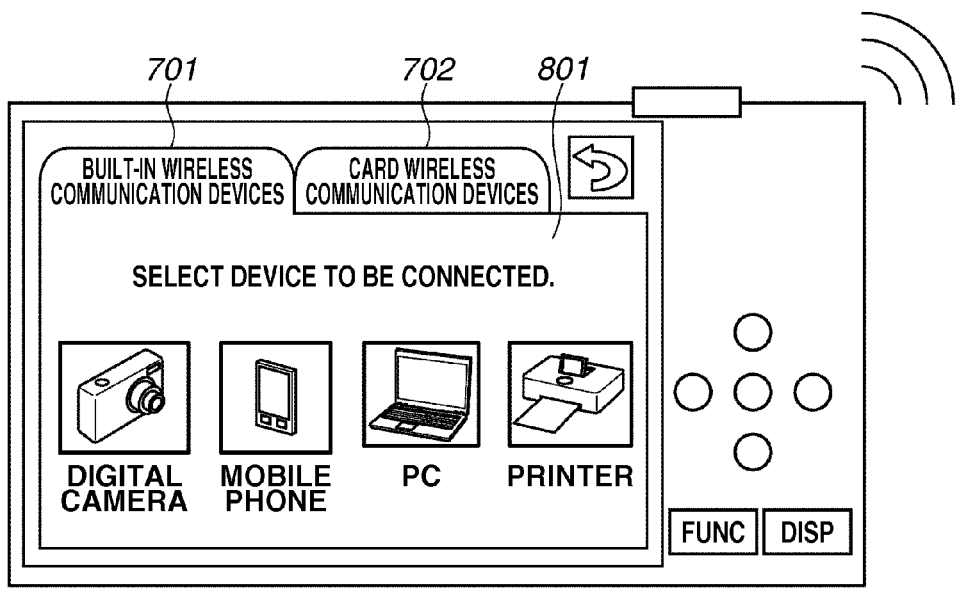
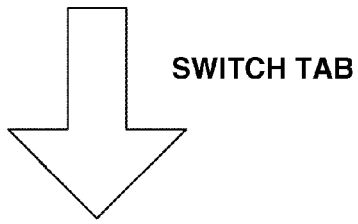
SWITCH TAB
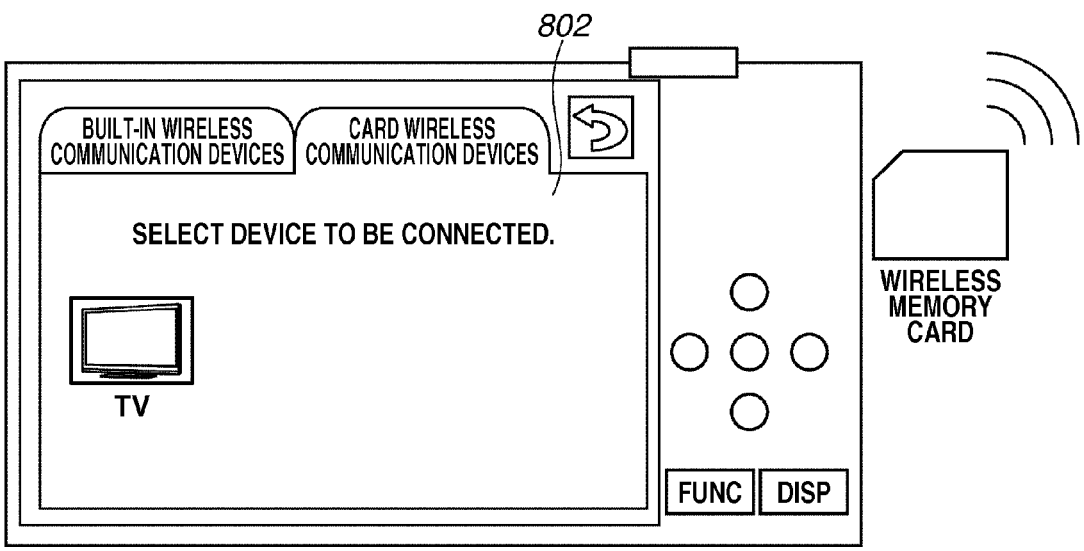

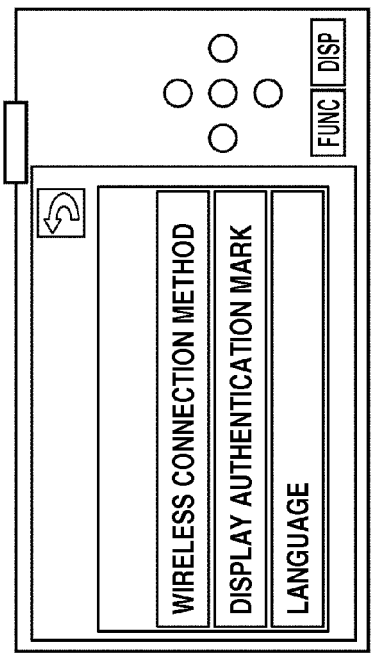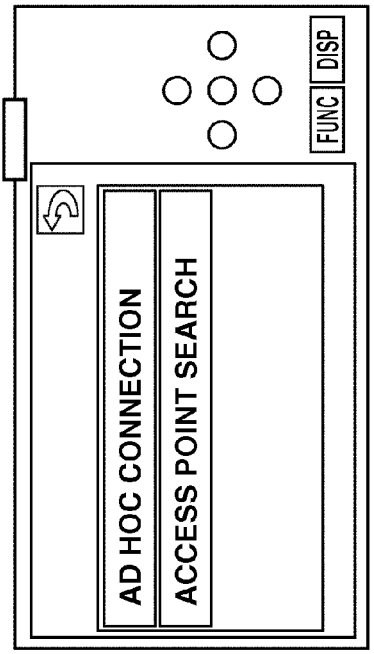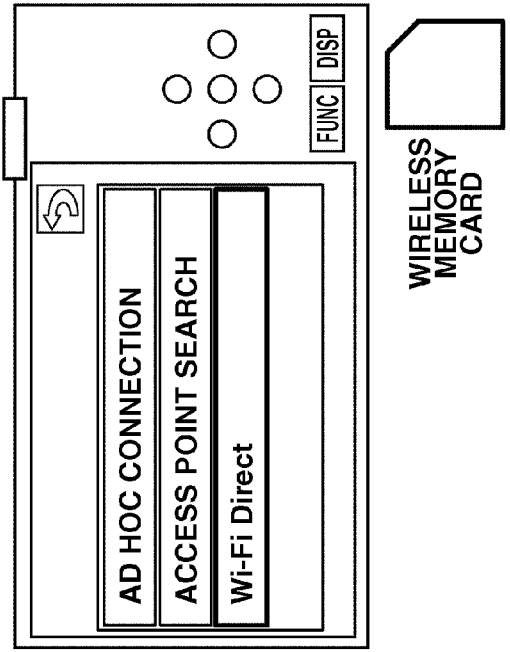

COMMUNICATION APPARATUS, CONTROL METHOD THEREFOR, AND STORAGE MEDIUM

BACKGROUND

1. Field

Aspects of the present invention generally relate to a communication apparatus to which a recording medium having a communication function is connectable.

2. Description of the Related Art

In recent years, a memory card having a wireless communication function has been on the market. Such a memory card allows a communication apparatus, such as an imaging apparatus, to more easily transfer image data to an external device. If the memory card is attached to a digital camera, the digital camera can transmit image data to an external device capable of performing wireless communication. Further, Japanese Patent Application Laid-Open No. 2011-128910 discusses an imaging apparatus on which an operation for setting a wireless communication function can be performed when a memory card having the wireless communication function is attached thereto.

On the other hand, a communication apparatus having a built-in wireless communication function is gradually becoming popularized. A user of the communication apparatus can thus use both the wireless communication function built in the communication apparatus and the wireless communication function of the memory card.

As described above, the wireless communication functions usable by the user are diversifying. Further, it is assumed that there will be cases where the user attaches a recording medium having the wireless communication function to the communication apparatus having the built-in wireless communication function. In such a case, if the wireless communication functions of both the communication apparatus and the recording medium become more diversified, the communication apparatus and the recording medium may have similar wireless communication functions.

SUMMARY OF THE INVENTION

According to an aspect of the present invention, a communication apparatus to which a recording medium is attachable includes a display unit configured to display a plurality of items related to a wireless communication function, a wireless communication unit configured to wirelessly communicate with an external device, a first determination unit configured to determine whether the recording medium attached to the communication apparatus is capable of performing wireless communication, and a second determination unit configured to determine, in a case where the first determination unit determines that the recording medium is capable of performing wireless communication, whether the recording medium includes a wireless communication function not included in the wireless communication unit, wherein, in a case where the second determination unit determines that the recording medium includes the wireless communication function not included in the wireless communication unit, the display unit displays an item related to a wireless communication function included in the wireless communication unit, and an item related to the wireless communication function not included in the wireless communication unit from among wireless communication functions included in the recording medium.

Further features of the present disclosure will become apparent from the following description of exemplary embodiments with reference to the attached drawings.

BRIEF DESCRIPTION OF THE DRAWINGS

FIGS. 4A, 4B, 4C, and 4D are schematic diagrams illustrating a communication system according to the first exemplary embodiment.

FIG. 7 illustrates an example of the display screen of the digital camera according to the first exemplary embodiment.

FIG. 8 illustrates an example of the display screen of the digital camera according to the first exemplary embodiment.

FIGS. 11A, 11B, and 11C illustrate examples of a display screen of a digital camera according to a third exemplary embodiment.

DESCRIPTION OF THE EMBODIMENTS

A first exemplary embodiment will be described below. According to the present exemplary embodiment, a digital camera, i.e., a communication apparatus, to which a memory card having a wireless communication function (hereinafter, referred to as a wireless memory card) is attachable, will be described as an example. Other image processing apparatus, such as a mobile phone and a tablet-type terminal, may also be used in addition to the digital camera.

<Imaging Apparatus>

Figure 1:
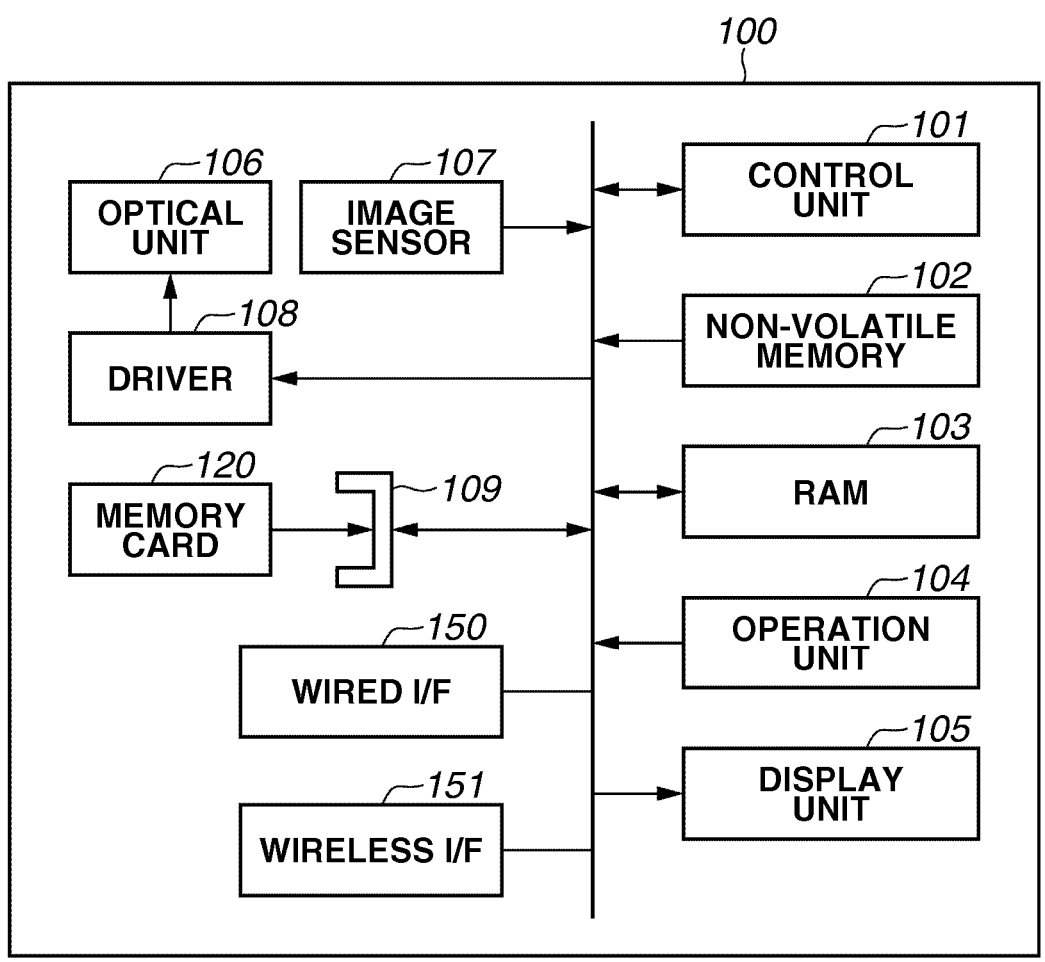
FIG. 1 illustrates a configuration of a digital camera according to a first exemplary embodiment.

FIG. 1 is a block diagram illustrating a configuration example of a digital camera 100.

Referring to FIG. 1, a control unit 101 is a programmable processor, such as a central processing unit (CPU) and a micro processing unit (MPU), which controls the entire digital camera 100. A non-volatile memory 102 stores processing procedures (i.e., a program) of the control unit 101, and graphical user interface (GUI) data including various settings and a menu screen of the digital camera 100.

A random access memory (RAM) 103 is used as a work area of the control unit 101. An operation unit 104 is a group of buttons and switches to be used by a user to issue various instructions to the digital camera 100.

A display unit 105, such as a liquid crystal display (LCD), is used to display a captured image and the menu screen for the user to specify various settings.

An optical unit 106 is mainly configured by lenses (e.g., a zoom lens and a focus lens) and actuators that drive the lenses.

An image sensor 107 is a charge-coupled device (CCD) image sensor or a complementary metal-oxide semiconductor (CMOS) image sensor. A driver 108 controls the optical unit 106 under control of the control unit 101.

A connector 109 is used for connecting a memory card 120, i.e., an attachable recording medium. According to the present exemplary embodiment, the digital camera 100 allows a wireless memory card, i.e., the memory card 120, to be connected thereto, as will be described below. A wired interface (I/F) 150 is a digital interface, such as a universal serial bus (USB), Institute of Electrical and Electronics Engineers (IEEE) 1394, and high-definition multimedia interface (HDMI). The wired I/F 150 is used for connecting the digital camera 100 to the external device by wired connection. A wireless I/F 151 includes a wireless chip and an antenna for performing wireless communication with the external device. According to the present exemplary embodiment, the wireless I/F 151 performs communication using a wireless local area network (LAN) under control of the control unit 101.

Further, the digital camera 100 stores in the non-volatile memory 102 a program for the digital camera 100 to function as a Picture Transfer Protocol (PTP) responder of PTP. The digital camera 100 is thus capable of transmitting to and receiving from an external PTP initiator the image data according to PTP. PTP communication may be performed via the wired I/F 150 or the wireless I/F 151.

<The Memory Card Having the Wireless Communication Function>

Figure 2:
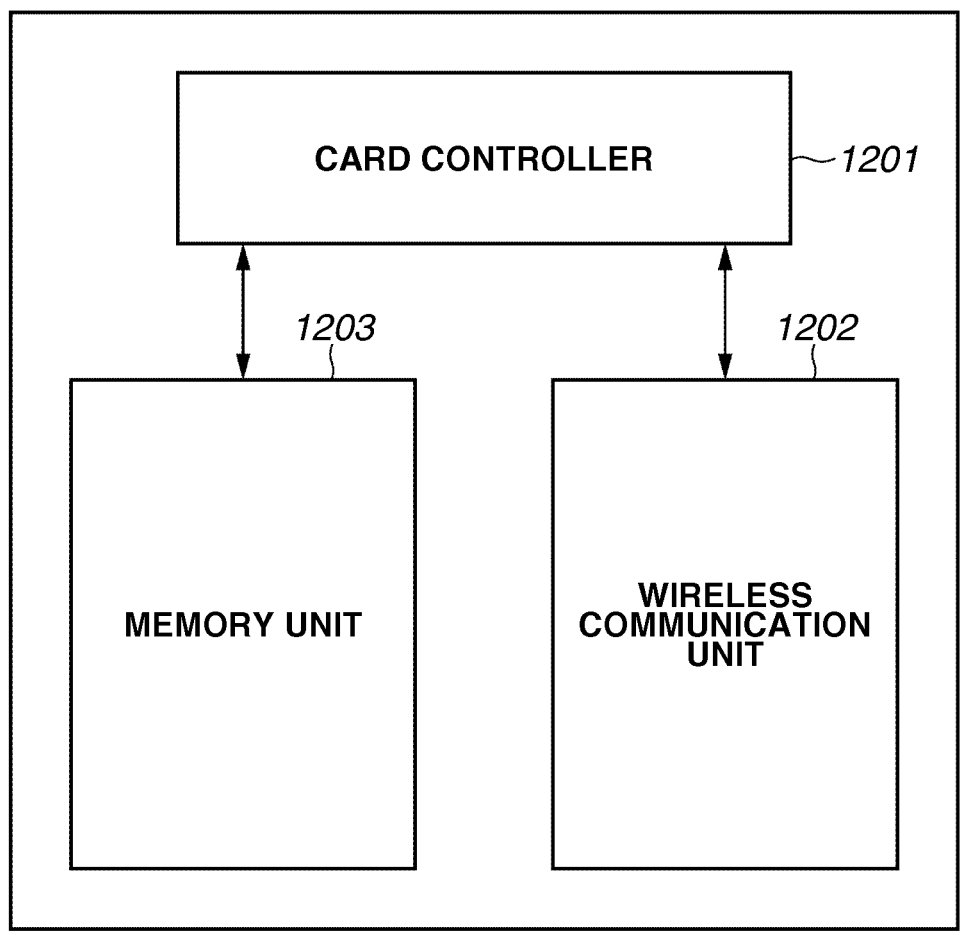
FIG. 2 illustrates a configuration of a wireless memory card according to the first exemplary embodiment.

FIG. 2 is a block diagram illustrating a configuration example of the wireless memory card, i.e., an example of a wireless recording medium. Referring to FIG. 2, the wireless memory card includes a card controller 1201, a wireless communication unit 1202, and a memory unit 1203.

The card controller 1021, which includes the CPU, a read-only memory (ROM), and the RAM, controls each unit in the wireless memory card and realizes various operations. For example, the card controller 1201 performs control to realize wireless communication control, PTP communication to be described below, and recording control as a normal memory card.

The wireless communication unit 1202, which includes the antenna and the wireless chip, realizes the wireless communication functions complying with wireless communication standards, such as the wireless LAN and Bluetooth (registered trademark). Further, according to the present exemplary embodiment, the wireless memory card also stores the program for communicating with an external device using PTP over Internet protocol (PTP/IP), and the program for functioning as the PTP responder.

The memory unit 1203 includes an inverted AND (NAND) type non-volatile memory, and stores data, such as still images, moving images, and audio data, written via the card controller 1201. The wireless memory card records a file based on a predetermined file system, such as Design rule for Camera File system (DCF), for functioning as the recording medium of the digital camera 100. In other words, the wireless memory card can also be used as a normal memory card.

<State Transition of the Wireless Memory Card>

Figure 3:
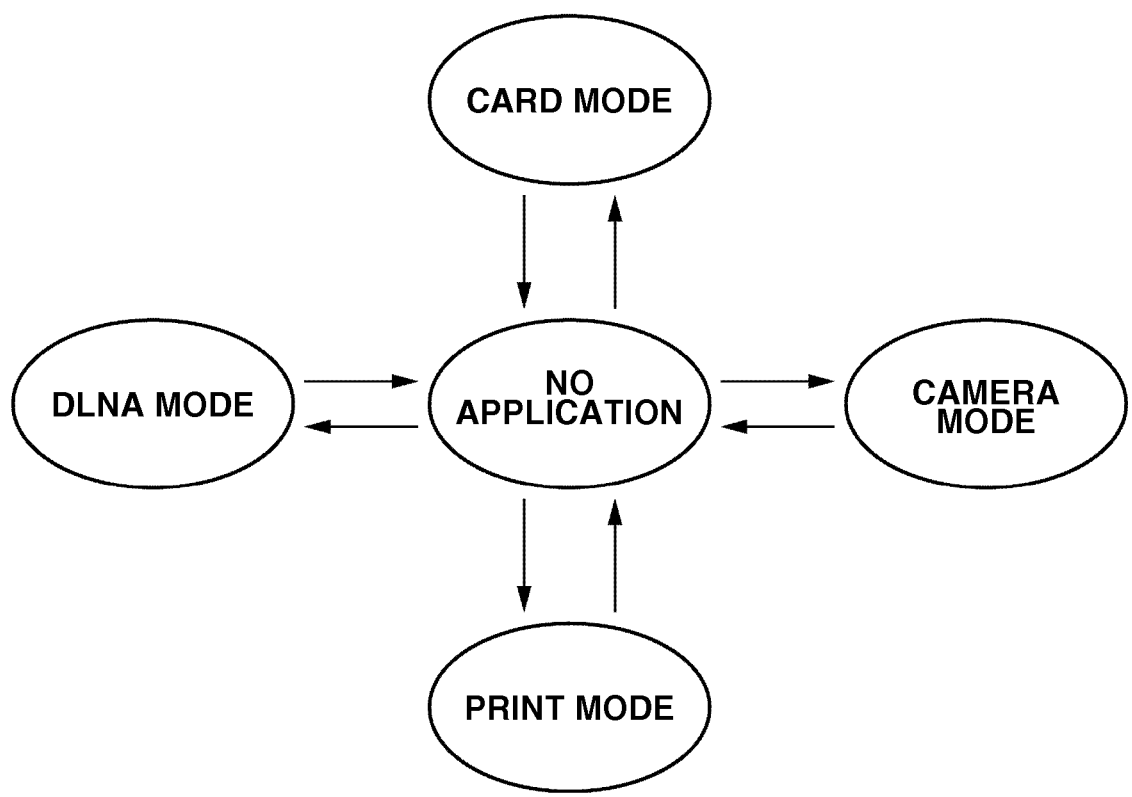
FIG. 3 illustrates state transition of the wireless memory card according to the first exemplary embodiment.

FIG. 3 illustrates the state transition of the wireless memory card according to the present exemplary embodiment. The wireless memory card includes a plurality of application modes as will be described below, and the application mode can be switched according to a command from a host device. According to the present exemplary embodiment, the application modes can be switched between a Digital Living Network Alliance (DLNA) mode, a card mode, a camera mode, and a print mode.

The DLNA mode is an operation mode for wirelessly connecting the digital camera 100 to a network of home electric appliances complying with the DLNA guideline, and for the digital camera 100 communicating with the home electric appliances such as a television set. According to the present exemplary embodiment, the wireless memory card operates as a media server, and provides contents to client devices, such as a media player represented by the television set.

The card mode is a mode in which the wireless memory card establishes, basically independent from the digital camera 100 as a host device, communication with the external device on the wireless communication network employing PTP/IP. The card mode is thus a mode in which the wireless memory card performs PTP communication with the external device. In such a mode, the wireless memory card functions as the PTP responder. It is assumed that the wireless memory card in the card mode communicates with a personal computer (PC), and transmits and receives the data by the user operating the PC.

The camera mode is the operation mode in which the wireless memory card functions as if it is a wireless communication adaptor of the digital camera 100. The camera mode thus enables PTP communication between the digital camera 100 and the external device on the wireless communication network. In the camera mode, the digital camera 100 functions as the PTP responder, and performs wireless PTP communication with the external device using PTP/IP stored in the wireless memory card. It is assumed in the camera mode that the digital camera 100 communicates with other camera or the mobile phone, and transmits and receives the data by the user operating the digital camera 100.

The print mode is the operation mode which realizes direct print using a printer existing on the wireless network. In the print mode, the digital camera 100 functions as the PTP responder, and performs wireless PTP communication with the external device using PTP/IP stored in the wireless memory card. The digital camera 100 then uses an application protocol for direct print and transmits a print job to the printer.

As illustrated in FIG. 3, transition between the application modes cannot be directly performed, and the application mode is always changed via a "No application" mode. In the "No application" mode, the wireless memory card performs operations necessary for maintaining the network connection, and searches for a connectable network.

According to the present exemplary embodiment, various wireless memory cards are assumed, and it is not necessary for all wireless memory cards to be changeable to the four application modes illustrated in FIG. 3. For example, there may be a wireless memory card that can only change to the DLNA mode, and a wireless memory card that can only change to the card mode, the camera mode, and the print mode.

<Communication Using a Built-in Wireless Unit>

Communication that can be realized using the wireless I/F 151 included in the digital camera 100 will be described below. Hereinafter, for ease of comparative description, the wireless I/F 151 will be referred to as a built-in wireless unit, and the wireless communication unit 1202 in the wireless communication memory card will be referred to as a card wireless unit.

FIGS. 4A, 4B, 4C, and 4D are schematic diagrams illustrating communication using the built-in wireless unit. Referring to FIGS. 4A, 4B, 4C, and 4D, according to the present exemplary embodiment, the digital camera 100 is connectable to other digital camera, the mobile phone, the PC, and the printer, using the built-in wireless unit.

Menu Display Examples

Figure 5:
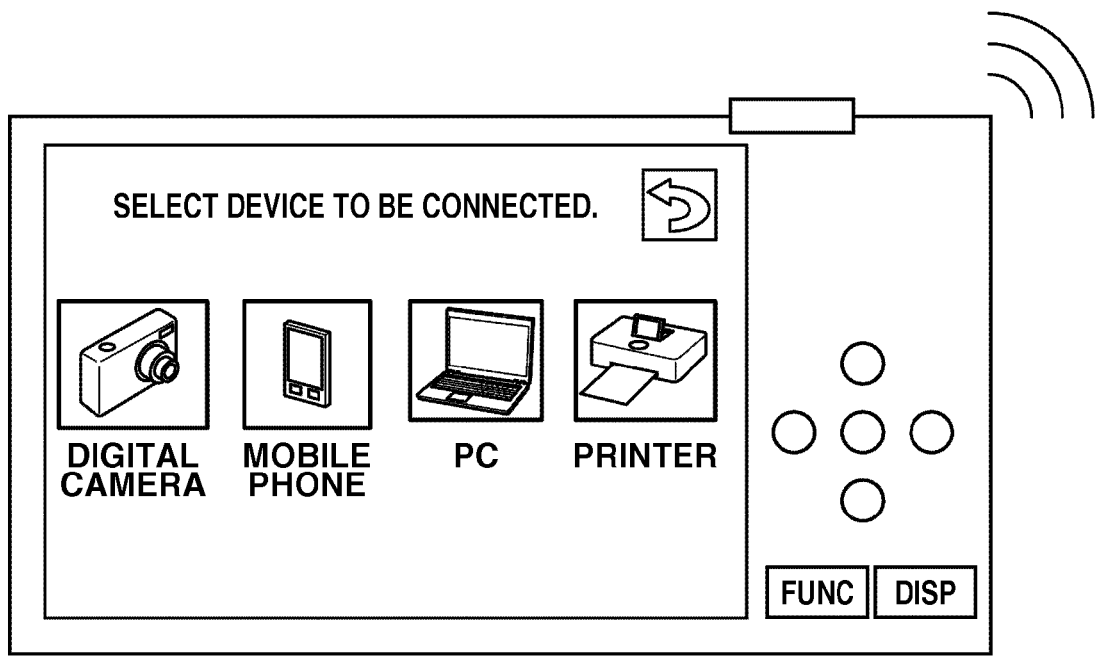
FIG. 5 illustrates an example of a display screen of the digital camera according to the first exemplary embodiment.

The user of the digital camera 100 performing a predetermined operation using the operation unit 104 can cause the display unit 105 to display a screen for selecting the device to communicate with. FIG. 5 illustrates an example of a communication device selection screen for selecting the device to communicate with using the built-in wireless unit among communication menus. The screen illustrated in FIG. 5 is displayed when the wireless memory card is not attached to the connector 109.

Referring to FIG. 5, the digital camera, the mobile phone, the PC, and the printer, i.e., the devices that the digital camera 100 can communicate with using the built-in wireless unit, are displayed as selectable menu items. If the user selects a desired device, a process for establishing communication between the digital camera 100 and the other device can be started.

<Communication Using the Wireless Memory Card>

Figure 6A:
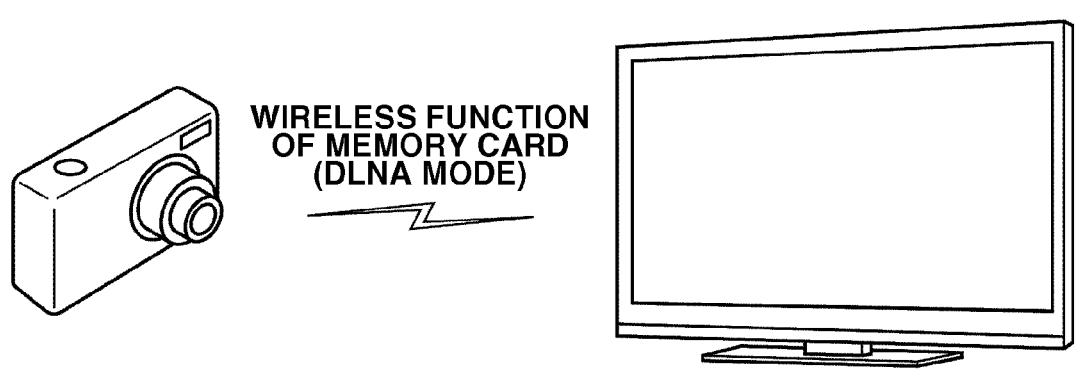
FIGS. 6A and 6B are schematic diagrams illustrating the communication system according to the first exemplary embodiment.
Figure 6B:
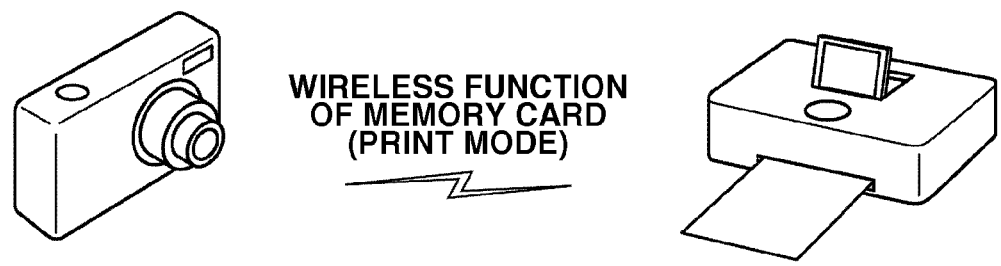

FIGS. 6A and 6B are schematic diagrams illustrating the case where the wireless memory card is attached to the digital camera 100, and communication is performed using the card wireless unit. The wireless memory cards illustrated as examples in FIGS. 6A and 6B can change between the DLNA mode and the print mode.

FIG. 6A illustrates the system in which the wireless memory card in the DLNA mode communicates with the television set. It is highly likely for the wireless memory card in the DLNA mode to communicate with the television set having the media player function. Upon establishing the connection with the television set, the wireless memory card transmits to the television set image data recorded in the memory unit 1203. The television set then becomes capable of displaying the received image data on a display.

FIG. 6B illustrates the system in which the wireless memory card in the print mode communicates with the printer. Upon establishing the connection with the printer, the wireless memory card transmits to the printer image data recorded in the memory unit 1203. The printer then becomes capable of printing the received image data.

<A Display Example of the Menu when the Wireless Memory Card is Attached (1)>

According to the above-described example, the built-in wireless unit is capable of communicating with the digital camera, the mobile phone, the PC, and the printer. Further, the card wireless unit is capable of communicating with the DLNA media player, such as the television set, and the printer. In other words, the digital camera 100 can communicate with the DLNA media player, e.g., the television set, only by using the card wireless unit, and can communicate with the printer by using either the built-in wireless unit or the card wireless unit. A case where the wireless memory card is connected to the digital camera 100 under such conditions will be described below.

FIG. 7 illustrates an example of the communication device selection screen displayed when the wireless memory card is attached to the digital camera 100. Referring to FIG. 7, the screen includes a "built-in wireless communication devices" tab 701 and a "card wireless communication devices" tab 702. The user can select one of the tabs by operating the operation unit 104.

A screen 703 is an example of the screen displayed when the user has selected the "built-in wireless communication devices" tab 701. The screen 703 displays, as the selectable menu items, the digital camera, the mobile phone, the PC, and the printer, i.e., the devices that the digital camera 100 can communicate with using the built-in wireless unit. The user selects the desired device, and the process for establishing communication between the digital camera 100 and the other device can thus be started.

A screen 704 is an example of the screen displayed when the user has selected the "card wireless communication devices" tab 702. The screen 704 displays, as the selectable menu items, the television set and the printer, i.e., the devices that the digital camera 100 can communicate with using the card wireless unit. The user selects the desired device, so that the wireless memory card is caused to change to the corresponding mode, and the process for establishing communication between the digital camera 100 and the other device can thus be started. The screen 704 illustrated in FIG. 7 displays the television set as a selection candidate. If the user actually selects the television set, the digital camera 100 can communicate with the DLNA media player satisfying predetermined conditions, such as providing a service for displaying the image.

<A Display Example of the Menu when the Wireless Memory Card is Attached (2)>

Another example of the communication device selection screen will be described below. If the user selects either the "built-in wireless communication devices" tab 701 or the "card wireless communication devices" tab 702 on the communication device selection screen illustrated in FIG. 7, the printer is displayed as the selection candidate in either case. If the user then selects a printer icon on the screen 703 or the screen 704, the printer prints the desired data. The resulting printing of the desired data is thus the same for the user in either case, despite the differences in using the built-in wireless unit or the card wireless unit. However, the user may become confused by a plurality of the same selectable items displayed on the different screens, even if there is no difference in choosing whichever of the same items.

To solve such a problem, there may be a display form in which one selection candidate is displayed with respect to overlapping communication functions between the built-in wireless unit and the card wireless unit. FIG. 8 illustrates an example of such a display form.

Referring to FIG. 8, a screen 801 is an example of a screen displayed when the "built-in wireless communication devices" tab 701 is selected. The screen 801 displays, as the selection candidates, the digital camera, the mobile phone, the PC, and the printer, i.e., the devices that the digital camera 100 can communicate with using the built-in wireless unit. This is the same as the screen 703 illustrated in FIG. 7.

A screen 802 is an example of a screen displayed when the "card wireless communication devices" tab 702 is selected. The screen 802 displays, as the selection candidate, only the television set and does not display the printer among the devices that the digital camera 100 can communicate with using the card wireless unit. Since communication with the printer overlaps with the function of the built-in wireless unit, the printer is not included.

The screen 802 may also only display the printer as the selection candidate. In the example illustrated in FIG. 8, communication with the printer using the built-in wireless unit is displayed in priority to communication with the printer using the card wireless unit for the following reason. It is assumed that reliability of communication using the built-in wireless unit, which is built in as the function of the digital camera 100, is higher than that of communication using the wireless memory card, of which various types may be attached to the digital camera 100.

<Process Flow>

A process flow of the digital camera 100 capable of displaying the screen illustrated in FIG. 8 will be described below with reference to FIG. 9. The process to be described below is realized by the control unit 101 in the digital camera 100 controlling each unit in the digital camera 100 or the memory card 120.

In step S901, the user switches the digital camera 100 on, and the process proceeds to step S903. Further, in step S902, a memory card lid changes from an open state to a closed state, and the process proceeds to step S903.

In step S903, the control unit 101 sets as the menu items for performing built-in wireless communication, the communication functions usable employing the built-in wireless unit. According to the example illustrated in FIG. 8, the digital camera, the mobile phone, the PC, and the printer are set as the menu items. The set items are to be displayed on the communication device selection screen.

In step S904, the control unit 101 accesses the memory card 120 attached to the connector 109, and determines the type of the card. The control unit 101 may determine by using a specific command and inquiring the memory card on the type of the card or vendor information. Further, the control unit 101 may determine by reading a specific area in the memory card 120. If the control unit 101 determines that the memory card 120 is the wireless memory card (YES in step S904), the process proceeds to step S905. If the control unit 101 does not determine that the memory card 120 is the wireless memory card (NO in step S904), the process proceeds to step S909. In step S909, the control unit 101 stands by for a user operation for displaying the communication device selection screen. The process performed in step S904 is an example of determination performed by a first determination unit.

In step S905, the control unit 101 obtains from the wireless memory card the communication functions corresponding to the wireless memory card. More specifically, the control unit 101 uses a predetermined inquiry command and inquires on the modes, to which the wireless memory card corresponds, among the four modes illustrated in FIG. 3. According to the example illustrated in FIG. 8, the control unit 101 obtains the information indicating that the wireless memory card corresponds to the DLNA mode and the print mode.

In step S906, the control unit 101 determines whether there is a function that the built-in wireless unit does not correspond to, among the communication functions of the wireless memory card acquired in step S905. According to the present exemplary embodiment, if a card wireless unit corresponds to the DLNA mode, the control unit 101 determines that the card wireless unit includes the function to communicate with the television set. Further, if a card wireless unit corresponds to the card mode, the control unit 101 determines that the card wireless unit includes the function to communicate with the PC. Furthermore, if a card wireless unit corresponds to the camera mode, the control unit 101 determines that the card wireless unit includes the function to communicate with other cameras and the mobile phone. Moreover, if a card wireless unit corresponds to the print mode, the control unit 101 determines that the card wireless unit includes the function to communicate with the printer. According to the example illustrated in FIG. 8, the wireless memory card corresponds to the DLNA mode and the print mode. The control unit 101 thus determines that the built-in wireless unit does not correspond to the function for communicating with the television set. The process performed in step S906 is an example of determination performed by a second determination unit.

In step S907, the control unit 101 specifies a setting for displaying the "built-in wireless communication devices" tab 701 and the "card wireless communication devices" tab 702 on the communication device selection screen. As a result of specifying such a setting, the tabs can be switched on the communication device selection screen.

In step S908, the control unit 101 sets as the menu items for the card wireless unit, the functions among the communication functions included in the wireless memory card and which are determined in step S906 that the built-in wireless unit does not correspond. According to the example illustrated in FIG. 8, the television set which is set as the menu item is to be displayed on the screen 802. Further, since communication with the printer overlaps with the communication function of the built-in wireless unit, the printer is not set as the menu item in step S908.

The above-described steps are the process for setting the menu items to be displayed. The process performed when the user operates the operation unit 104 to display the communication device selection screen in step S909 will be described below.

In step S909, the user performs the display operation, and, in step S910, the control unit 101 displays the communication device selection screen illustrated in FIG. 8. In such a case, the display forms of the screens illustrated in FIGS. 5 and 8 are displayed based on the items set in step S903, step S907, and step S908.

The process performed when the user operates the operation unit 104 to select the menu item in step S911 will be described below. In such a case, in step S912, the control unit 101 determines whether the selected item is the menu item for performing communication using the built-in wireless unit. If the control unit 101 determines that the selected item is the menu item for the built-in wireless unit (YES in step S912), the process proceeds to step S913. If the control unit 101 determines that the selected item is not the menu item for the built-in wireless unit (NO in step S912), i.e., the selected item is the menu item for performing communication using the card wireless unit, the process proceeds to step S914. If the processes of step S907 and step S908 have not been performed, the process necessarily proceeds to step S913. The process performed in step S912 is for determining whether to perform communication using the built-in wireless unit or the card wireless unit.

In step S913, the control unit 101 uses the built-in wireless unit and executes the communication process corresponding to the selected menu item.

In step S914, the control unit 101 transmits to the wireless memory card an instruction to change to the mode corresponding to the selected menu item. The control unit 101 then performs control so that communication corresponding to the instructed mode is performed.

The operation of the digital camera 100 is as described above. According to the present exemplar embodiment, the wireless memory card corresponding to the DLNA mode and the print mode is described as an example. However, the wireless card corresponding to other modes may also be used. In such a case, the control unit 101 sets in step S906 as the menu items to be displayed, only the functions that are not included as the communication functions of the built-in wireless unit, similar to the above-described example.

A second exemplary embodiment will be described below. According to the first exemplary embodiment, the "built-in wireless communication devices" tab 701 and the "card wireless communication devices" tab 702 are displayed as illustrated in FIG. 8, and the communication functions to be used thus become switchable. However, as described with reference to FIG. 9, if there are no overlapping menu items between the cases where the "built-in wireless communication devices" tab 701 is selected and the "card wireless communication devices" tab 702 is selected, it may be easier for the user to view the screen by the digital camera 100 collectively displaying the communicable devices.

According to the present exemplary embodiment, the communication device selection screen illustrated in FIG. 10 to be described below is thus displayed instead of the communication device selection screen illustrated in FIG. 8. Since a large number of common portions exist between the present exemplary embodiment and the first exemplary embodiment, the description on the common portions will not be repeated, and the portion unique to the present exemplary embodiment will be mainly described.

Figure 10:
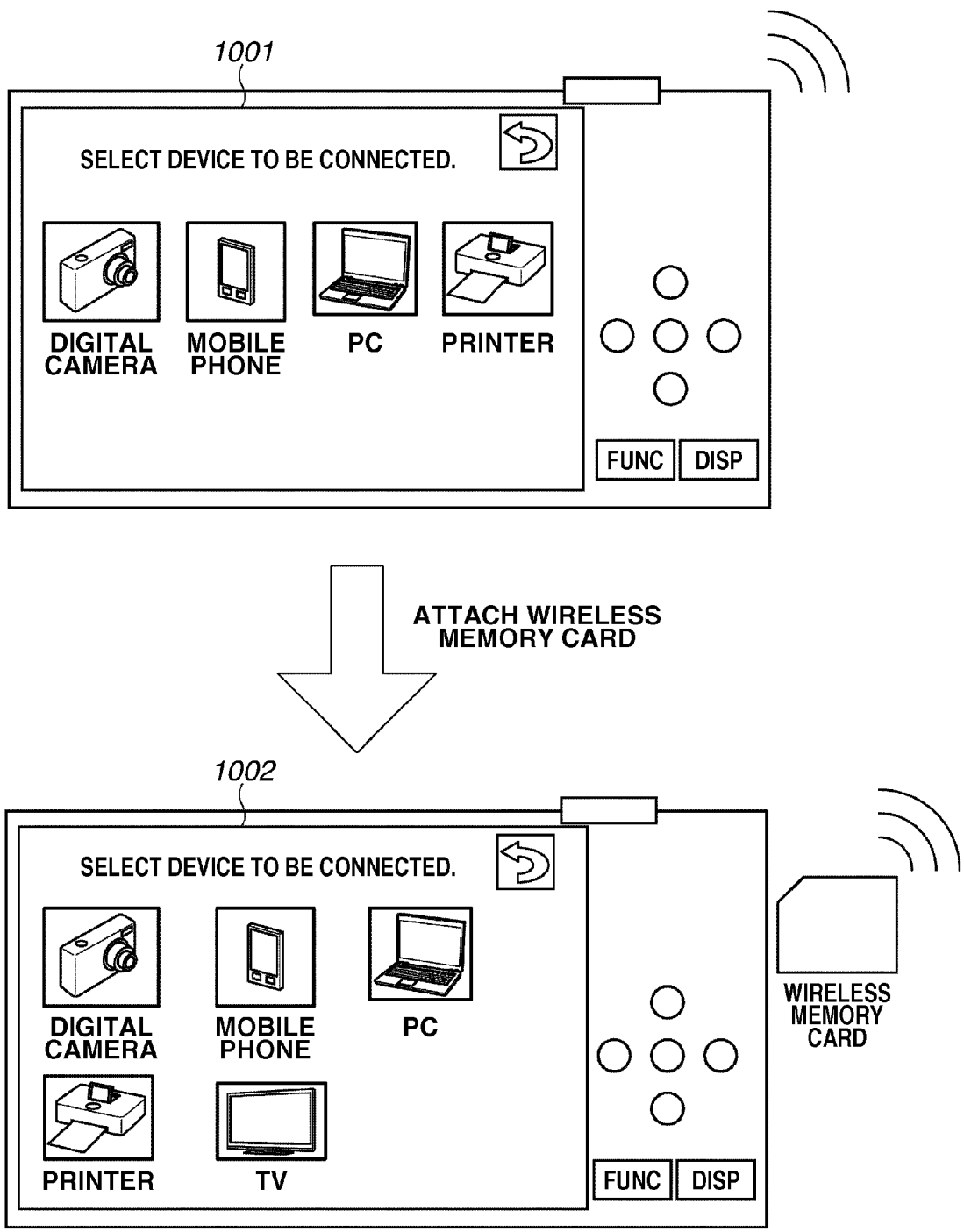
FIG. 10 illustrates an example of a display screen of a digital camera according to a second exemplary embodiment.

Referring to FIG. 10, a screen 1001 is the communication device selection screen which is displayed when the wireless memory card is not attached, similar to the screen 501 illustrated in FIG. 5. If the wireless memory card is then attached to the digital camera 100, a screen 1002 is displayed as the communication device selection screen. The tabs are not displayed on the screen 1002, and the menu items displayed on the screen 1001 and the television set are instead displayed on the screen 1002. In other words, the digital camera 100 collectively displays on one screen the menu items corresponding to the communication functions of the built-in communication unit and the communication functions of the card wireless unit. As a result, the user becomes capable of collectively viewing the communicable devices.

If the user selects one of the digital camera, the mobile phone, the PC, and the printer on the screen 1002, the digital camera 100 uses the function of the built-in wireless unit and starts communicating with the selected device. On the other hand, if the user selects the television set, the digital camera 100 instructs the wireless communication card to change to the DLNA mode. In other words, the built-in wireless unit or the card wireless unit may be used depending on the type of device even if the devices are displayed in one screen.

The display screen illustrated in FIG. 10 thus allows the user to use the functions of the built-in wireless unit and the card wireless unit without being aware of which unit is to be used.

A third exemplary embodiment will be described below. Since a large number of common portions exist between the present exemplary embodiment and the first and second exemplary embodiments, the description on the common portions will not be repeated, and the portion unique to the present exemplary embodiment will be mainly described.

According to the first and second exemplary embodiments, the display form of the communication device selection screen is changed based on the communication functions of the built-in wireless unit and the card wireless unit. In contrast, the present exemplary embodiment focuses on a difference in network connection methods among the communication functions of the built-in wireless unit and the card wireless unit. For example, the methods for connecting to (i.e., participating in) the wireless network of the wireless LAN includes ad hoc connection, infrastructure connection, and connection using Wi-Fi direct method. The connection using Wi-Fi direct method is a connection method in which one of the devices that communicate with each other becomes an access point in the connection process, and the devices thus directly communicate with each other. The connection method the device corresponds to depends on the device. As a result, the built-in wireless unit in the digital camera 100 and the wireless memory card may correspond to different connection methods. To solve such a problem, according to the present exemplary embodiment, if the wireless memory card is attached to the digital camera 100 including the built-in wireless unit, the display screen displays the respective connection methods the digital camera and the wireless memory card correspond to.

According to the present exemplary embodiment, the digital camera 100 corresponds to the ad hoc connection and the infrastructure connection as the functions of the built-in wireless unit. Further, according to the case to be described below, the wireless memory card corresponding to the ad hoc connection, the infrastructure connection, and the connection using Wi-Fi direct method is attached to the digital camera 100.

FIG. 11A illustrates an example of the menu screen displayed on the display unit 105 of the digital camera 100 according to the present exemplary embodiment. Referring to FIG. 11A, the screen is displayed according to the user operation. If the user then presses a "wireless connection method" button on the screen, the screen shifts to a connection method selection screen for the user to select the connection method.

FIG. 11B illustrates an example of the connection method selection screen displayed when the wireless memory card is not attached to the connector 109. Referring to FIG. 11B, the screen displays an "ad hoc connection" button for designating as the connection method the connection in the ad hoc mode, and an "access point search" button for designating as the connection method the connection in the infrastructure mode. Such connection methods can be realized by the built-in wireless unit. If each button is selected by the user operation, the digital camera 100 uses the built-in wireless unit and starts the connection process according to the connection method corresponding to the selected button.

FIG. 11C is an example of the connection method selection screen displayed when the wireless memory card is connected to the connector 109. Referring to FIG. 11C, the screen displays, in addition to the "ad hoc connection" button and the "access point search" button, a "Wi-Fi Direct" button for the user designating as the connection method the connection using the Wi-Fi Direct method. In other words, if the screen illustrated in FIG. 11C is compared with the screen illustrated in FIG. 11B, the connection method, to which the built-in wireless unit does not correspond, among those, to which the wireless memory card corresponds, is added as the menu item. The connection method to which the built-in wireless unit does not correspond is thus added to the screen illustrated in FIG. 11C. If each button is then selected by the user operation, the digital camera 100 starts the connection process according to the connection method corresponding to the selected button. Similar to the second exemplary embodiment, if the overlapping connection method is selected in the present exemplary embodiment, the digital camera 100 starts the communication using the built-in wireless unit. In other words, if the "ad hoc connection" button and the "access point search" button are selected in the example illustrated in FIG. 11C, the digital camera 100 connects to the network using the built-in wireless unit. Further, if the "Wi-Fi Direct" button is selected, the digital camera 100 connects to the network using the card wireless unit.

The display screens illustrated in FIGS. 11A, 11B, and 11C thus allow the user to use the functions of the built-in wireless unit and the card wireless unit without being aware of which unit is to be used. According to the present exemplary embodiment, the items of the built-in wireless unit and the card wireless unit are collectively displayed on one menu screen as in the second exemplary embodiment. However, the screen may be switched using the tabs as illustrated in FIG. 8. In such a case, if the user has selected the "card wireless communication devices" tab 702, only the "Wi-Fi Direct" button is displayed.

Exemplary embodiments have been described above. These exemplary embodiments are not to be seen to be limiting, and various modifications and changes may be made within the scope of the disclosure.

Figure 9:
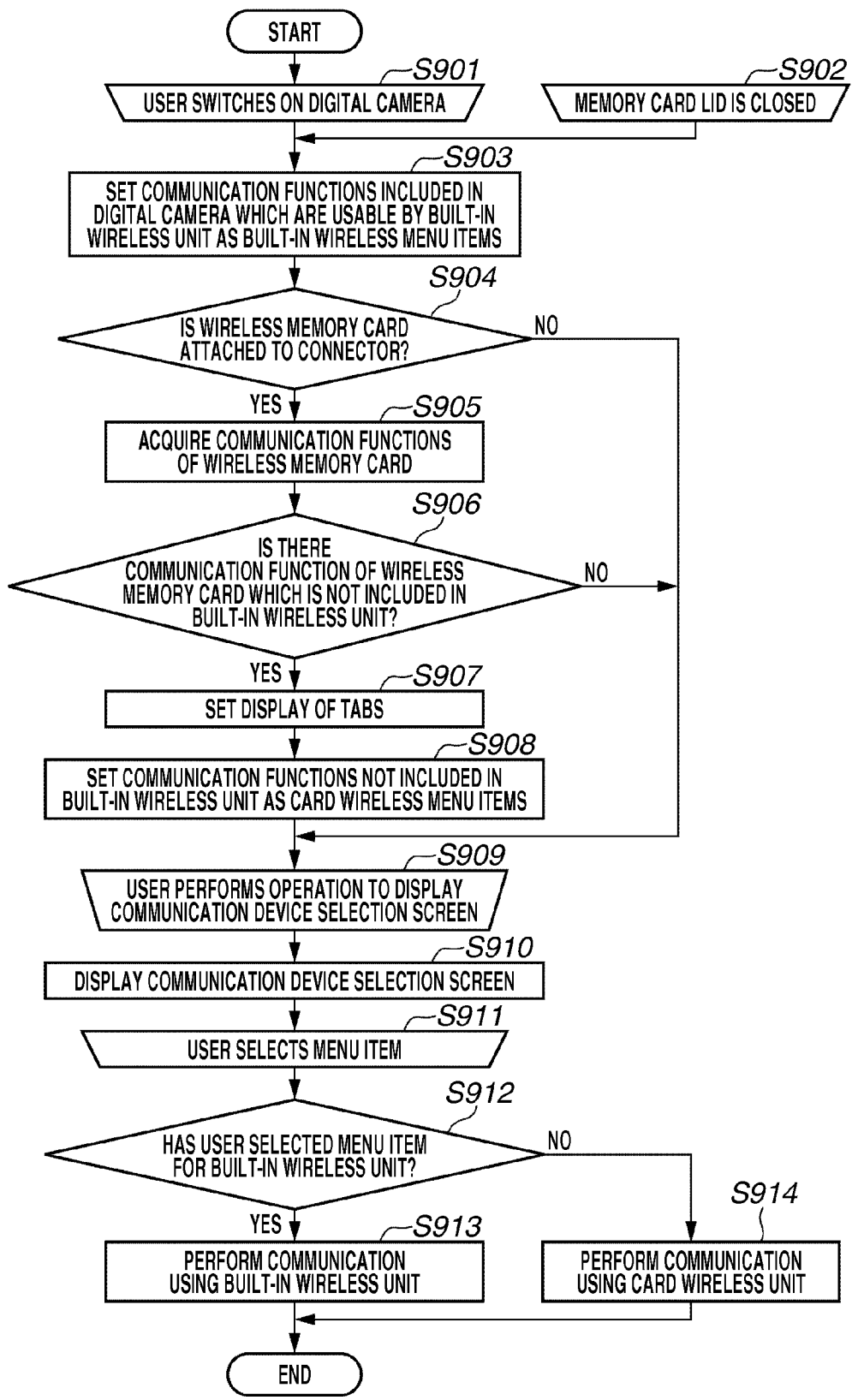
FIG. 9 is a flowchart illustrating an operation of the digital camera according to the first exemplary embodiment.

For example, according to the above-described exemplary embodiments, if the wireless memory card is attached to the digital camera 100, the CPU 101 determines the communication functions corresponding to the wireless memory card (i.e., refer to step 904 and step S905 illustrated in FIG. 9). However, if the digital camera 100 is capable of controlling validity and invalidity of the wireless communication functions of the wireless memory card, the CPU 101 may determine between step S904 and step S905 whether the wireless communication function is valid. In such a case, if the wireless communication function is valid, the CPU 101 determines the communication function in step S905. If the wireless communication function is invalid, the screen illustrated in FIG. 5 may be displayed regardless of the communication functions of the wireless memory card.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not limiting. The scope of the following claims is to be accorded the broadest interpretation so as to encompass all such modifications and equivalent structures and functions.

This application claims the benefit of Japanese Patent Application No. 2012-192925 filed Sep. 3, 2012, which is hereby incorporated by reference herein in its entirety.

The invention claimed is:

1. A communication apparatus to which a recording medium is attachable, the communication apparatus comprising:
   a display unit configured to display a plurality of menu items related to a wireless communication function;
   a wireless communication unit configured to wirelessly communicate with an external device;
   a first determination unit configured to determine whether the recording medium attached to the communication apparatus is capable of performing wireless communication; and
   a second determination unit configured to determine, in a case where the first determination unit determines that the recording medium is capable of performing wireless communication, whether the recording medium includes a wireless communication function not included in the wireless communication unit,
   wherein, in a case where the second determination unit determines that the recording medium includes a wireless communication function not included in the wireless communication unit the display unit displays a menu item related to a wireless communication function included in the wireless communication unit, and a menu item related to the wireless communication function not included in the wireless communication unit from among wireless communication functions included in the recording medium.

2. The communication apparatus according to claim 1, wherein the display unit displays, a menu item related to a wireless communication function that both the wireless communication functions included in the wireless communication unit and the wireless communication functions included in the recording medium include.

3. The communication apparatus according to claim 1, wherein the display unit displays the menu items related to the wireless communication functions included in the wireless communication unit together with menu items related to the wireless communication functions included in the recording medium.

4. The communication apparatus according to claim 1, wherein the display unit displays a list of menu items related to the wireless communication functions included in the wireless communication unit and a list of menu items related to the wireless communication functions included in the recording medium, wherein display can be switched between lists.

5. The communication apparatus according to claim 1, further comprising a selection unit configured to select one of the menu items displayed on the display unit, wherein determining whether to perform communication using the wireless communication unit or the recording is based on the selected menu item.

6. The communication apparatus according to claim 5, wherein, in a case where the selection unit selects a menu item related to a wireless communication function that is included in the recording medium and not included in the wireless communication unit, a mode of the recording medium is changed to a mode corresponding to the menu item selected by the selection unit.

7. The communication apparatus according to claim 1, wherein the recording medium is capable of transmitting image data based on at least Digital Living Network Alliance (DLNA).

8. The communication apparatus according to claim 1, wherein the wireless communication unit is capable of transmitting image data based on Picture Transfer Protocol (PTP).

9. The communication apparatus according to claim 1, wherein the display unit displays a type of device to communicate with as the plurality of menu items related to the wireless communication function.

10. The communication apparatus according to claim 9, wherein the type of device to communicate with includes a mobile phone.

11. The communication apparatus according to claim 9, wherein the type of device to communicate with includes a printer.

12. The communication apparatus according to claim 1, wherein the display unit displays a method for connecting to a network as the plurality of menu items related to the wireless communication function.

13. The communication apparatus according to claim 12, wherein the method for connecting to the network includes an ad hoc connection, an infrastructure connection, or a Wi-Fi direct connection.

14. A method for controlling a communication apparatus, to which a recording medium is attachable, including a wireless communication unit configured to wirelessly communicate with an external device, the method comprising:
   displaying a plurality of menu items related to a wireless communication function;
   determining whether the recording medium attached to the communication apparatus is capable of performing wireless communication; and determining, in a case where it is determined that the recording medium is capable of performing wireless communication, whether the recording medium includes a wireless communication function not included in the wireless communication unit, wherein, in a case where it is determined that the recording medium includes the wireless communication function not included in the wireless communication unit, a menu item related to a wireless communication function included in the wireless communication unit and a menu item related to the wireless communication function not included in the wireless communication unit from among wireless communication functions included in the recording medium are displayed.

15. A non-transitory computer-readable storage medium storing a program that causes a computer execute the method of claim 14.

* * * * *